United States Patent
Kessler et al.

(10) Patent No.: US 12,509,809 B2
(45) Date of Patent: Dec. 30, 2025

(54) METHOD AND SYSTEM FOR SETTING PARAMETERS OF A TREATMENT CYCLE

(71) Applicant: Henkel AG & Co. KGaA, Duesseldorf (DE)

(72) Inventors: Arnd Kessler, Monheim am Rheim (DE); Ingo Hardacker, Hamminkeln (DE); Slavoljub Barackov, Monheim (DE); Thomas Juckel, Monheim (DE); Annette Dietrich, Erkrath (DE)

(73) Assignee: HENKEL AG & CO. KGAA, Duesseldorf, NY (US)

( * ) Notice: Subject to any disclaimer, the term of this patent is extended or adjusted under 35 U.S.C. 154(b) by 401 days.

(21) Appl. No.: 17/771,722

(22) PCT Filed: Oct. 23, 2020

(86) PCT No.: PCT/EP2020/079884
§ 371 (c)(1),
(2) Date: Apr. 25, 2022

(87) PCT Pub. No.: WO2021/078941
PCT Pub. Date: Apr. 29, 2021

(65) Prior Publication Data
US 2022/0403578 A1   Dec. 22, 2022

(30) Foreign Application Priority Data

Oct. 25, 2019   (EP) .................................... 19205241

(51) Int. Cl.
*D06F 33/32* (2020.01)
*D06F 33/46* (2020.01)
(Continued)

(52) U.S. Cl.
CPC .............. *D06F 33/32* (2020.02); *D06F 33/46* (2020.02); *D06F 34/18* (2020.02); *D06F 34/24* (2020.02);
(Continued)

(58) Field of Classification Search
CPC . D06F 2101/00–20; D06F 2103/00–70; D06F 2105/00–62; D06F 1/00–95/008;
(Continued)

(56) References Cited

U.S. PATENT DOCUMENTS 5,905,648 A * 5/1999 Badami .................. D06F 33/36
700/55
2001/0049846 A1   12/2001 Guzzi et al.
(Continued)

FOREIGN PATENT DOCUMENTS

CN      109629184 A  * 4/2019
DE    102016111821 A1   12/2017
(Continued)

OTHER PUBLICATIONS

Wikipedia, "regression analysis," archived on Wayback Machine (Jul. 22, 2019), available at https://web.archive.org/web/20190722202934/https://en.wikipedia.org/wiki/Regression_analysis. (Year: 2019).*

(Continued)

*Primary Examiner* — Kaj K Olsen
*Assistant Examiner* — Richard Z. Zhang
(74) *Attorney, Agent, or Firm* — Ingrassia Fisher & Lorenz, LLP (57) ABSTRACT

A method and system for setting parameters of a treatment cycle in a household appliance is provided. First a model establishing a relationship between sets of configuration parameter values of achievable treatment performance is obtained. Then a target treatment performance for the treat- (Continued)

ment cycle is obtained. Values for a subset of a configuration parameter are fixed, the subset comprising at most all configuration parameters but a remaining configuration parameter. Then, a value for the remaining configuration parameter is determined. For this value, a difference between the target treatment performance and an achievable treatment performance predicted by the model using said value is below a predetermined threshold. Finally, the parameters of the treatment cycle, which can be setting parameters of the treatment cycle in the household appliance are output. The parameters comprise the determined value and the fixed values.

7 Claims, 8 Drawing Sheets

(51) Int. Cl.
| | | |
|---|---|---|
| *D06F 34/18* | (2020.01) | |
| *D06F 34/24* | (2020.01) | |
| *D06F 103/04* | (2020.01) | |
| *D06F 103/22* | (2020.01) | |
| *D06F 103/24* | (2020.01) | |
| *D06F 103/32* | (2020.01) | |
| *D06F 103/38* | (2020.01) | |
| *D06F 105/02* | (2020.01) | |
| *D06F 105/20* | (2020.01) | |
| *D06F 105/48* | (2020.01) | |
| *D06F 105/56* | (2020.01) | |

(52) U.S. Cl.
CPC ...... *D06F 2103/04* (2020.02); *D06F 2103/22* (2020.02); *D06F 2103/24* (2020.02); *D06F 2103/32* (2020.02); *D06F 2103/38* (2020.02); *D06F 2105/02* (2020.02); *D06F 2105/20* (2020.02); *D06F 2105/48* (2020.02); *D06F 2105/56* (2020.02)

(58) Field of Classification Search
CPC ... A47L 15/00–508; A47L 2301/00–08; A47L 2401/00–34; A47L 2501/00–36
See application file for complete search history.

(56) References Cited

U.S. PATENT DOCUMENTS

| | | |
|---|---|---|
| 2003/0106164 A1 | 6/2003 | Metzger-Groom et al. |
| 2010/0306927 A1 * | 12/2010 | Oh .......................... D06F 33/36 68/12.01 |
| 2012/0234354 A1 | 9/2012 | Jerg et al. |
| 2016/0333513 A1 | 11/2016 | Zattin et al. |

FOREIGN PATENT DOCUMENTS

| | | | |
|---|---|---|---|
| DE | 102016119225 A1 * | 4/2018 | |
| EP | 0844326 A1 | 5/1998 | |
| EP | 1433894 A1 | 6/2004 | |
| EP | 1434909 A1 | 7/2004 | |
| KR | 20040046994 A | 6/2004 | |
| WO | 2010057827 A1 | 5/2010 | |

OTHER PUBLICATIONS

Emir Lasic, et al., Construction of Virtual Washing Machine, Cleaning and Hygiene, Tenside Surf. Det. 52, 2015, pp. 193-200.

* cited by examiner

METHOD AND SYSTEM FOR SETTING PARAMETERS OF A TREATMENT CYCLE

CROSS-REFERENCE TO RELATED APPLICATION

This application is a U.S. National-Stage entry under 35 U.S.C. § 371 based on International Application No. PCT/EP2020/079884, filed Oct. 23, 2020, which was published under PCT Article 21(2) and which claims priority to European Application No. 19205241.3, filed Oct. 25, 2019, which are all hereby incorporated in their entirety by reference.

TECHNICAL FIELD

The present disclosure relates to the field of methods for parameterizing treatment cycles for example on household appliances and to systems allowing the customization of configuration parameters set on a household appliance to perform a treatment cycle. It can for example relate to the selection of the best combination of parameters in order to perform a cleaning cycle in a washing machine, a dishwashing machine, to perform a drying cycle in a dryer or to perform ironing of textiles according to a target performance that a user seeks to achieve.

BACKGROUND

Household appliances such as washing machines, dishwashers, dryers, irons typically comprise several preset programs. A user can select the most suitable program in order to perform a treatment cycle on items to cleaned, dried or ironed. Despite an increase in the number of available programs or preset settings, users are either provided fixed values for the parameters based on assumptions made by the appliance manufacturer on the outcome of the treatment cycle, or users need to set all the parameters individually without having the required technical expertise to understand whether their selection is correct.

A treatment cycle such a cleaning cycle in a washing machine or a dishwasher can be parameterized using very complex combinations of parameters including for example temperature, length of the cleaning cycle, amount of cleaning agent dispensed. All these parameters as well as others that are not necessarily controllable such as water hardness or rotation of the drum are not independent. Typically, changing one of these parameters can influence the effect of the other parameters on the outcome of a treatment cycle.

In 1959, Dr. Herbert Sinner noticed that the mechanical properties of a household appliance, the duration of a cleaning cycle, the maximum temperature reached during a cleaning cycle and the features of the chemistry that is dispensed during the cleaning cycle are all related parameters. A change in one would lead to a different effect on the cleaning performance of all other parameters.

In order to allow a user to achieve a target performance, such as for example obtaining the cleanest items, or performing the most ecological treatment cycle while still providing an acceptable level of cleanliness, special prerecorded programs are generally saved in a memory of the household appliance. These programs set the treatment parameters of the household appliance according to standard settings, which do not adequately reflect the specific needs of the user.

As of today, the complexity of the interdependence of configuration parameters in a treatment cycle in a household appliance is not fully understood. Attempts were made in 2015 to model the behavior of washing machines using mathematical functions. This is described for example in the article "Construction of Virtual Washing Machine" Tenside Surf. Det. 52 (2015) page 193 by Emir Lasic, Rainer Stamminger, Christian Nitsch and Arnd Kessler.

It appears that the selection of parameters for a treatment cycle to be performed on items still is done to a large extent manually and with unprecise assumptions on the achievable treatment performance.

For the above reasons, a method and system for better setting the treatment parameters of a treatment cycle in a household appliance is sought.

BRIEF SUMMARY

To address the above need, the present disclosure provides a method for setting parameters of a treatment cycle in a household appliance, the method comprising:

obtaining a model establishing a relationship between different sets of reference configuration parameter values of treatment cycles and values of achievable treatment performance;

obtaining a target treatment performance for the treatment cycle;

obtaining fixed values for a subset of at least one configuration parameter from the reference configuration parameters of the treatment cycle, the subset of at least one configuration parameter comprising at most all configuration parameters but at least one remaining configuration parameter from the reference configuration parameters;

determining a value for the at least one remaining configuration parameter for which a difference between the target treatment performance and an achievable treatment performance predicted by the model using said value is below a predetermined threshold;

outputting the parameters of the treatment cycle, the parameters of the treatment cycle being usable as setting parameters of the treatment cycle in the household appliance, the parameters comprising the determined value for the at least one remaining configuration parameter and the fixed values for the subset of the at least one configuration parameter.

The present disclosure provides a method to set the parameters of the treatment cycle of a household appliance in a customized way, and in accordance with a goal that a user wishes to achieve with the treatment cycle.

The term "treatment cycle" refers to a washing, cleaning, drying or ironing performed on items to be treated by the household appliance.

Among possible examples of household appliances to which the method of the present disclosure can be applied, washing machines, dishwashers, irons and dryers are particularly suitable machines. However, the notion of household appliance should not be limited to these machines exclusively. The method of the present disclosure can be applied to any treatment cycle performed with any material means, including for example washing textiles in a basin with no mechanical parts.

The term "treatment performance" encompasses goals that a user can set or which can be programmed or programmable in a memory of a data-processing device for example. Examples of treatment performances are provided below and can typically include: a maximum cleanliness of the items to be cleaned (dishware or textiles), a minimization of the number of stains or soilings on items to be cleaned, a minimization of the amount of electricity or water used during the treatment cycle, a minimization of the noise generated by the household appliance during the treatment cycle, a minimization of the emission of $CO_2$ generated during the treatment cycle. A treatment performance can typically be expressed in an arbitrary unit that is indicative of the degree to which a goal is achieved. For cleanliness this can be an arbitrary number or grade, a rating provided from previous experiments performed on items to be treated, or a value that is predicted based on an understanding of the treatment cycles in the household appliance.

The terms "reference configuration parameters" refers to parameters provided together or for the generation of a model that is capable of predicting values for treatment performances based on combinations or sets of configuration parameters. The term "configuration parameter" refers to the physical or technical parameters that can be used to characterize a treatment cycle. In the example of a washing machine, these can for example include the parameters established by Herbert Sinner (temperature, cleaning agents used and their amount, duration of the cycle, mechanical properties of the drum of the machine). Further parameters can further be taken into account.

The "model" can typically comprise a list of discreet values of different sets of configuration parameters and the associated treatment performance values. It can also comprise a function comprising a continuous extrapolated correspondence between values of sets of configuration parameters and associated measured, predicted or extrapolated treatment performance values.

The present disclosure can determine some values of the treatment parameters from sensors or from general information on the environment in which the household appliance is used. Such values can for example include the water hardness of the water used in the treatment cycle, the number of rotations per minute of the drum of the household appliance, or at least the values technically achievable by the household appliance. Others can be fixed by the user himself, such as the temperature or the duration of the treatment cycle.

Values of the remaining unfixed configuration parameters can then be predicted from the model based on the target selected by the user. Such unfixed configuration parameters can for example include the amount of cleaning agent to be applied.

In addition to providing suggestions for the unfixed configuration parameters, the model may also assist a user in changing some of the fixed parameters, if it appears that a small change in one of them would provide better achievement of the target treatment performance.

According to an embodiment, the method may further comprise:
obtaining the model in the form of a function by:
obtaining values of treatment performances achieved for different sets of reference configuration parameter values of previous treatment cycles;
determining a function fitting the obtained values of treatment performances, the function establishing the relationship between the different sets of configuration parameter values and the obtained values of treatment performances, the different sets of configuration parameters being variables of the function and the obtained values of treatment performance being an approximation of an image of the function.

According to an embodiment, the function is a multidimensional function comprising at least four variables.

Advantageously the at least four variables are a maximum temperature applied during the cleaning cycle, a number of rotations of the drum (for example per minute) of the washing machine, an amount of cleaning agent used, a duration of the cleaning cycle. Further parameters can be added such as the weight of the load to be cleaned, a value indicative of the dirtiness of the load, a value indicative of the water hardness used.

According to an embodiment, the function may be a polynomial function.

According to an embodiment, the model may be determined using an analysis of variance approach.

Alternatively, other methods for obtaining a model of a function based on a limited set of experimental datapoints can be used. In particular, the present disclosure may use different linear regression approaches, machine learning approaches or manual approximations. Automatized approaches are preferred as the complexity of the data that needs to be fitted renders difficult any manual estimation of a function usable as a model for predicting achievable treatment performance values. Design of experiments is the general approach using to determine the model. Preferred design of experiments approaches include the I-optimal approach and the response surface methodology.

According to an embodiment, the different sets of reference configuration parameters may comprise at least two among:
a load of items introduced inside the household appliance;
a temperature inside a treatment chamber of the household appliance;
a number of turns per second of a rotating element of the household appliance;
a value of a water hardness of water used by the household appliance during the treatment cycle;
a value of dirtiness of soilings on items to be treated;
a duration of the treatment cycle;
an amount of a type of cleaning agent.

According to an embodiment, the achievable treatment performance may comprise at least one among:
a cleanliness value of the treatment cycle;
a number of soilings remaining on the items to be treated;
a value indicative of the amount of water used during the treatment cycle;
a value indicative of the amount of energy consumed during the treatment cycle;
a value indicative of the greenhouse gas emissions generated during the treatment cycle;
a duration of the treatment cycle;
a value indicative of the noise generated by the household appliance during the treatment cycle;
a temperature reached in a treatment chamber of the household appliance during the treatment cycle;
a number of rotations per minute of a drum of the household appliance during the treatment cycle.

According to an embodiment, the at least one remaining configuration parameter comprising at least two remaining configuration parameters, the method may further comprise:
determining, based on the obtained model, one selected configuration parameter from the at least two remaining configuration parameters having values for which the difference between the target treatment performance and an achievable treatment performance predicted by the model using said values of the selected configuration parameter is minimized.

According to an embodiment, the method may further comprise:
determining a group of values for the at least one remaining configuration parameter for which a difference between the target treatment performance and an achievable treatment performance predicted by the model using said group of values is below a predetermined threshold;

outputting a list of suggested configuration parameters of the treatment cycle, the parameters of the treatment cycle being adapted to set the treatment parameters of the household appliance using the determined group of values for the at least one remaining configuration parameter and the fixed values for the subset of at least one configuration parameter.

The present disclosure can take further advantage of the method by using it to set configuration parameters of a household appliance.

In particular such a use of the method can comprise:
running a treatment cycle with the set configuration parameters on the household appliance.

The present disclosure also pertains to a system for setting parameters of a treatment cycle in a household appliance, the system comprising:

a data-processing device, capable of communicating with the storage medium and configured to:
obtain and store a model establishing a relationship between different sets of reference configuration parameter values of treatment cycles and values of achievable treatment performance;
obtain a target treatment performance for the treatment cycle;
obtain fixed values for a subset of at least one configuration parameter from the reference configuration parameters of the treatment cycle, the subset of at least one configuration parameter comprising at most all configuration parameters but at least one remaining configuration parameter from the reference configuration parameters;
determine a value for the at least one remaining configuration parameter for which a difference between the target treatment performance and an achievable treatment performance predicted by the model using said value is below a predetermined threshold;
a household appliance, capable of receiving instructions from the data-processing device, the household appliance receiving parameters of the treatment cycle in the form of the determined value for the at least one remaining configuration parameter and the fixed values for the subset of at least one configuration parameter.

The system described above typically is suitable for implement the method described above.

According to an embodiment, the system may further comprise:
at least one sensor to determine at least one value from the subset of configuration parameters.

More than one sensor can be used, some of the sensors being arranged on the household appliance while others could further be standalone sensors or sensors that are part of other devices interacting with the household appliance, such a device for dispensing cleaning agents into the household appliance.

According to an embodiment, the system may further comprise:
a dosing device configured to be placed inside a treatment chamber of the household appliance and to dispense at least one cleaning agent into the treatment chamber.

According to an embodiment, the dosing device may be configured to dispense an adjustable amount of the at least one cleaning agent at an adjustable time of the treatment cycle, the adjustable amount and the adjustable time being further configuration parameters of the treatment cycle.

The method of the present disclosure can further be implemented by a computer. Consequently, the present disclosure also includes a computer program product suitable for implementing steps of the method described above. The present disclosure typically also pertains to a non-transitory computer readable storage medium having stored thereon a computer program comprising instructions for execution of a method for setting parameters of a treatment cycle in a household appliance, the instructions comprising:

accessing a model establishing a relationship between different sets of reference configuration parameter values of treatment cycles and values of achievable treatment performance;

receiving a target treatment performance for the treatment cycle;

obtaining fixed values for a subset of at least one configuration parameter from the reference configuration parameters of the treatment cycle, the subset of at least one configuration parameter comprising at most all configuration parameters but at least one remaining configuration parameter from the reference configuration parameters;

determining a value for the at least one remaining configuration parameter for which a difference between the target treatment performance and an achievable treatment performance predicted by the model using said value is minimized;

outputting parameters of the treatment cycle, the parameters being configured to control the treatment cycle of the household appliance using the determined value for the at least one remaining configuration parameter and the fixed values for the subset of at least one configuration parameter.

BRIEF DESCRIPTION OF THE DRAWINGS

The present disclosure will hereinafter be described in conjunction with the following drawing figures, wherein like numerals denote like elements, and.

DETAILED DESCRIPTION

The present disclosure provides a method to determine the best combination of parameters to run a treatment cycle, in particular in a household appliance. It is also conceivable that the method of the present disclosure is applied locally, on any device that is capable of receiving items to be treated. A bowl with no mechanical parts filled with water and to which detergent is added for handwash or for leaving textiles in the bowl with no mechanical effort applied to it can also be considered as a household appliance within the meaning of this present disclosure. However, the most straightforward application of this method is in determining the correct and most appropriate settings in machines such as washing machines, dishwashers, dryers or irons.

The method relies on a model which is capable of predicting the outcome of a treatment cycle when a certain set of configuration parameters is chosen to run the treatment cycle. The capability of predicting such an outcome makes it possible to find suitable values for configuration parameters of a treatment cycle in order to achieve a desired treatment performance. In particular, the present disclosure can take advantage of past measurements of such treatment cycles and generate a function which processes configuration parameters as inputs and provides a value for a treatment performance as output. Such a function is generally a multidimensional function that has at least two, sometimes more than seven variables as input.

Figure 1:
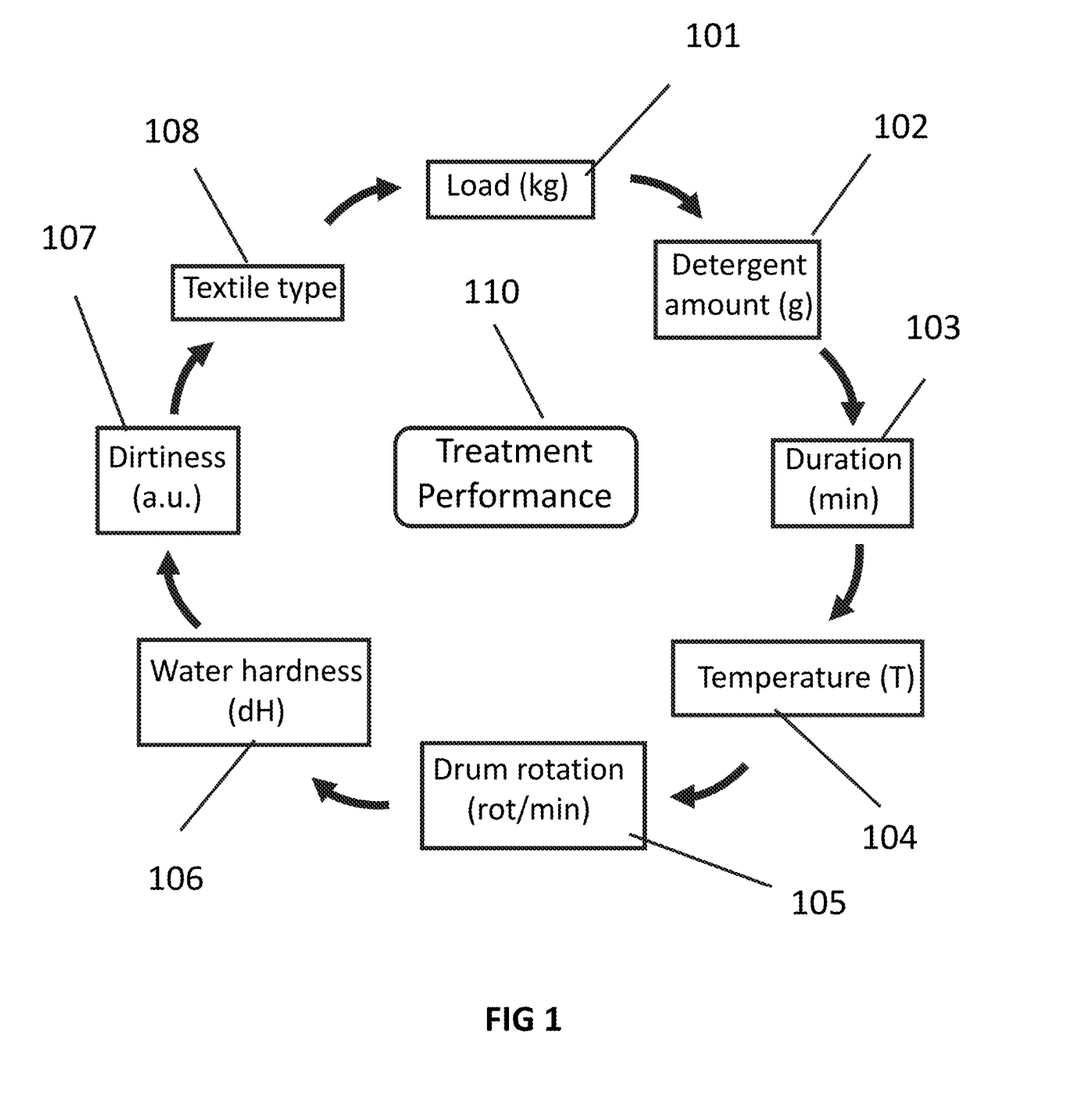
FIG. 1 is a schematic representation of a Sinner diagram showing the interdependencies between seven configuration parameters in a washing cycle of a washing machine.

As illustrated on FIG. 1, a treatment performance 110 such as obtaining clean textiles can be set as a target or goal to be achieved. Parameters of the washing cycle, in particular those that can be selected or programmed in a washing machine appear to all be interdependent. A change in one parameter can lead to the necessity to modify other parameters in order to maintain the same value of the cleanliness of textiles at the end of the washing cycle.

Treatment parameters are also called configuration parameters 101-108 and can typically include the load of textiles inserted into the washing machine, the amount of detergent added, the duration of the cleaning cycle, the temperature set for the cleaning process, the mechanical properties of the washing machine such as the number of rotations per minute of the drum of the washing machine, the water hardness, the degree of dirtiness of the textiles to be cleaned and the type of textiles.

Similar interdependence graphs can be generated for other treatment cycles for dishwashers, irons or dryers. For the sake of clarity, the following examples will be provided in connection with the determination of the right combination of configuration parameters 101-108 in a washing machine.

Figure 2:
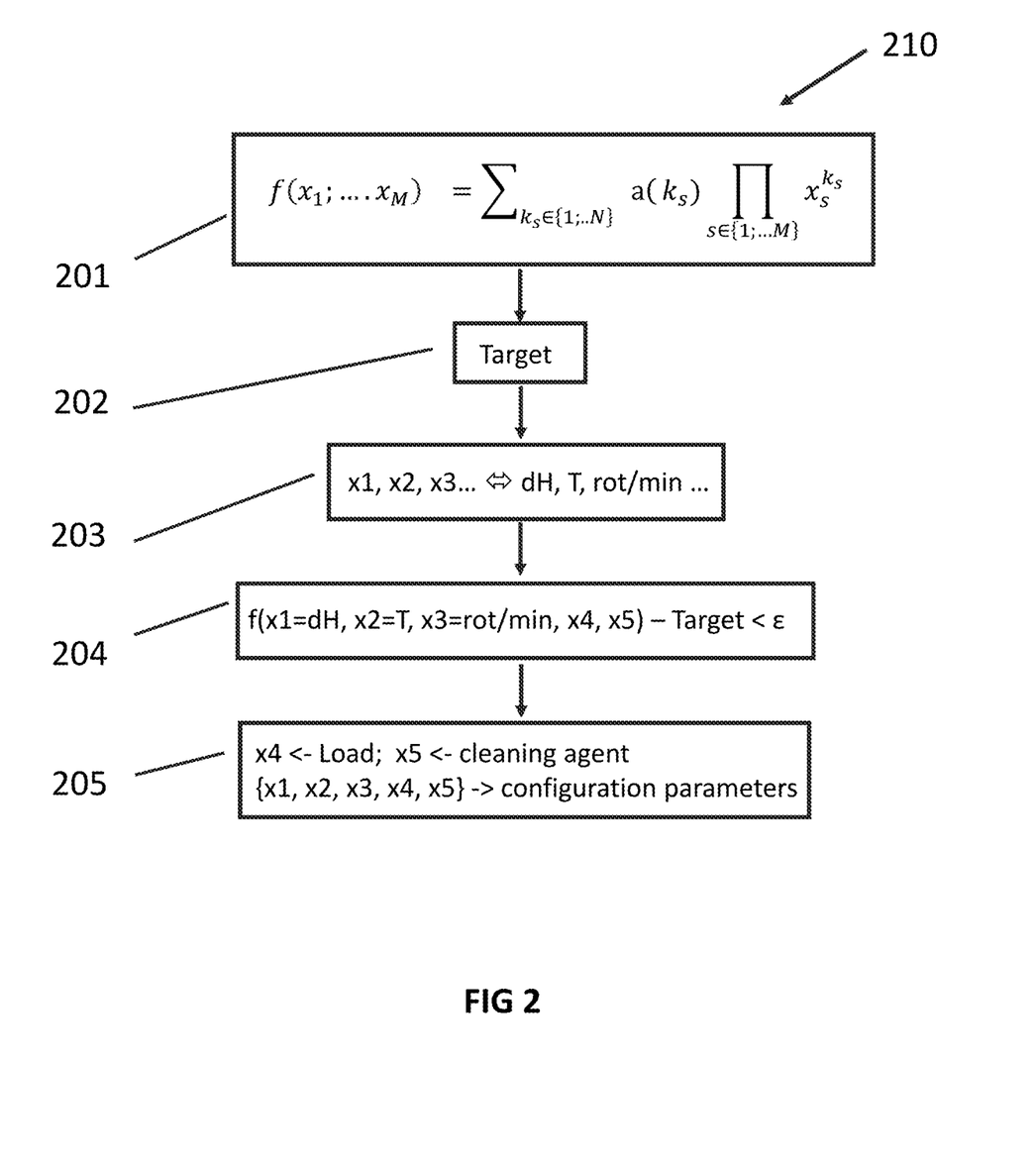
FIG. 2 is a simplified flowchart of a method according to an exemplary embodiment.

For illustration purposes, FIG. 2 provides a flowchart of steps that occur in the method 210 of the present disclosure in order to set the parameters of a treatment cycle in a household appliance.

At first, a model 201 that establishes a relationship between sets of configuration parameters, considered as inputs of the model and values of achievable treatment performance considered as outputs of the model is obtained.

The model 201 can be obtained in different ways. It can be created on the basis of a linear interpolation of different data points. Data points are formed by a list of values for sets of configuration parameters, for example from past knowledge of cleaning cycles or from past measurements performed on similar cleaning cycles. Each set of configuration parameters is associated with a treatment performance value.

Configuration parameters 101-108 can typically include: a load of items introduced inside the household appliance, a temperature inside a treatment chamber of the household appliance, a number of turns per second of a rotating element of the household appliance, a value of a water hardness of water used by the household appliance during the treatment cycle, a value of dirtiness of soilings on items to be treated, a duration of the treatment cycle, an amount of a type of cleaning agent. Fewer or more of these parameters can be taken into account. It is possible to only include two of the above listed parameters in a washing machine for example.

The model can also be created on the basis of a more sophisticated regression of data points, for example using the least squares method.

A manual interpolation on a graphical representation of the data points in a coordinate space can also be done.

Other analytical methods to fit a set of data points with a mathematical function can be used. In particular, a "design of experiments" approach can be used to fit a set of discreet data points with a mathematical function. This design of experiments approach can be assimilated to an analysis of variance approach. Both approaches are well known from the prior art.

For example, methods involving randomized experiments, optimal design, response surface methodology, can be used.

Preferred approaches include I-optimal designs and response surface methodology. A Bayesian optimization of the data set can further be used in a dynamic design of experiments approach.

The model that is generated with this approach can advantageously be a polynomial function involving several variables or any other function capable of reproducing the dependencies of the multiple variables accurately.

A polynomial function of multiple variables can advantageously be written as:

$$f(x_1; \ldots ; x_M) = \sum_{k_s \in \{1;..N\}} a(k_s) \prod_{s \in \{1;..M\}} x_s^{k_s}$$

Where f is a polynomial function of M variables x1 to xM, N is the degree of the polynomial function and $a(k_s)$ are the coefficients identified by the design of experiments approach.

Examples of such a function are provided further below in one example embodiment of the present disclosure.

Once this function is determined, in particular the values of the coefficients $a(k_s)$, the interdependence of all configuration parameters for treatment cycles are known.

It should be noted that a function f can be defined either for a combination of different dirt types to be cleaned, or one function could be defined for each dirt type individually. If a general function f is known for a combination of all dirt types, a reduced function can be extracted for each dirt type by removing some of the experimental data points corresponding to the contribution of the irrelevant dirt types.

The function f can encompass the interdependence of configuration parameters regardless of the type of household appliance that is used. In fact, a household appliance as such is not even a relevant machine for application of the teachings of this present disclosure. As mentioned above, any treatment context, even the cleaning of textiles by hand in a bowl of water comprising detergent can be viewed as being assimilated to a "household appliance".

Despite the high level of generalization provided by function f and its ability to predict the outcome of a treatment process regardless of the household appliance that is used, function f can provide even more accurate results if it is established based on data that is related to a type of household appliance in particular. For example, the inclusion of the number of rotations per minute of the drum in a washing machine is a parameter that can influence the treatment performance value and be more household appliance specific. Function f can therefore also be reduced or determined as a function that is specific to a household appliance.

Once a model 201 such as for example a polynomial function as described above has been obtained or determined, a target treatment performance 202 is set. This target is advantageously set either qualitatively or quantitatively. A qualitative target value can for example be set as a general goal: obtain the cleanest textiles. Qualitative targets can further include more than one criterion, and for example put restriction on some other parameters such as: how to reach a maximum cleanliness while consuming less than X grams of detergent. Or how to obtain a cleaning performance above value Y while minimizing energy consumption. To determine the combination of configuration parameters that allow achieving such a qualitative target treatment performance, a mathematical analysis of the variations and image of function f can be put in place.

Alternatively, target treatment performance 202 can be defined as a quantitative value. This can for example be an amount of energy not to be overcome, a noise level not to be reached during the treatment cycle, a maximum temperature below which the treatment cycle should occur, an maximum amount of $CO_2$ generated during the treatment cycle, or a maximum number of stains allowed on the items to be treated.

Examples of possible achievable treatment performances include: a cleanliness value of the treatment cycle; a number of soilings remaining on the items to be treated; a value indicative of the amount of water used during the treatment cycle; a value indicative of the amount of energy consumed during the treatment cycle; a value indicative of the greenhouse gas emissions generated during the treatment cycle; a duration of the treatment cycle; a value indicative of the noise generated by the household appliance during the treatment cycle; a temperature reached in a treatment chamber of the household appliance during the treatment cycle; a number of rotations per minute of a drum of the household appliance during the treatment cycle.

According to a basic embodiment of the present disclosure, no configuration parameter 101-108 of the model is fixed, and the values of each configuration parameter 101-108 are determine by studying variations of the model.

A set of values for configuration parameters 101-108 is deemed to fulfill the target treatment performance 202 when the difference between the prediction output by the model using these values and the value of the target treatment performance 202 is below a predetermined threshold, noted epsilon on FIG. 2.

This predetermined threshold can for example be set as a value within 25% of the best treatment performance value that is achievable according to the predictions of the model.

The threshold can also be set by a user who can determine the acceptable margins within the target performance that he defines. A simple approach could consist in determining an extremum of the function f as corresponding to the best achievable treatment performance. The corresponding values for the configuration parameters are then defined as the settings for the treatment cycle.

According to a different and more frequent embodiment a subset 203 of configuration parameters 101-108 has fixed values. These values are fixed either by the user, by the technical possibilities of the household appliance, or by other external factors. This can for example be the case with water hardness, which can have a fixed value dependent on the location in which the treatment cycle occurs. Other remaining configuration parameters such as for example the number of rotations per minute of a drum of the household appliance can be restricted to the number of values that are technically accessible by the appliance and be limited to a finite number of discreet values. This would then reduce the space of values that need to be analyzed for the function f in order to determine the values of the remaining configuration parameters.

Some of the values from the subset 203 can be measured by a sensor that is part of the household appliance or a stand alone sensor. Examples of sensors include water hardness measuring devices. The water hardness can for example be measured by a calibrated electrode measuring conductivity of water, or an optical sensor measuring the turbidity of water which can be related to its hardness. Other sensors are used to measure the temperature inside a drum or housing in which items to be treated are placed inside the household appliance, or the number of rotations per minute of the drum of the appliance.

The values of the remaining configuration parameters 204 are determined using the model. As seen on FIG. 2, function f is used by trying different values of the remaining configuration parameters 204 until values are found which a difference of the output of the achievable treatment performance predicted by the function is close enough to the target treatment performance value 202. The acceptable difference should be lower than a predetermined threshold value, as already discussed above.

Finally, the setting parameters 205 to be used for the treatment cycle can be output and for example set on the household appliance to run a treatment cycle thereon. The setting parameters 205 are comprised of the fixed values of the subset 203 of configuration parameters and the values of the remaining configuration parameters 204 determined using the predictions from the model.

In the example illustrated on FIG. 2, the remaining configuration parameters 204 are comprised of the load of items to be cleaned and the amount of detergent to be used in the household appliance. However, it should be noted that other remaining configuration parameters can typically be used. For example, the timing of the release of the detergent into the housing of the household appliance can be a remaining configuration parameter 204, or the temperature of the water in the housing, or the duration of the treatment cycle.

In addition to the embodiments presented for illustration purposes above, the present disclosure can also take further advantage of the mathematical properties of the model that is obtained in order to identify the most suitable treatment setting 205. For example, the extrema of the f function can be determined by calculating the partial derivatives of this function.

A graphical representation of the function in a contour plot for example can also be used in order to display to a user the whole range of possible values to reach a target treatment performance. Several contour plots can be plotted with all but two configuration parameters fixed, in order to obtain a complete graphical representation of the variations of the f function.

The present disclosure also concerns a system that is capable of implementing the method described above. One example of elements of such a system are schematically represented on FIG. 3.

Figure 3:
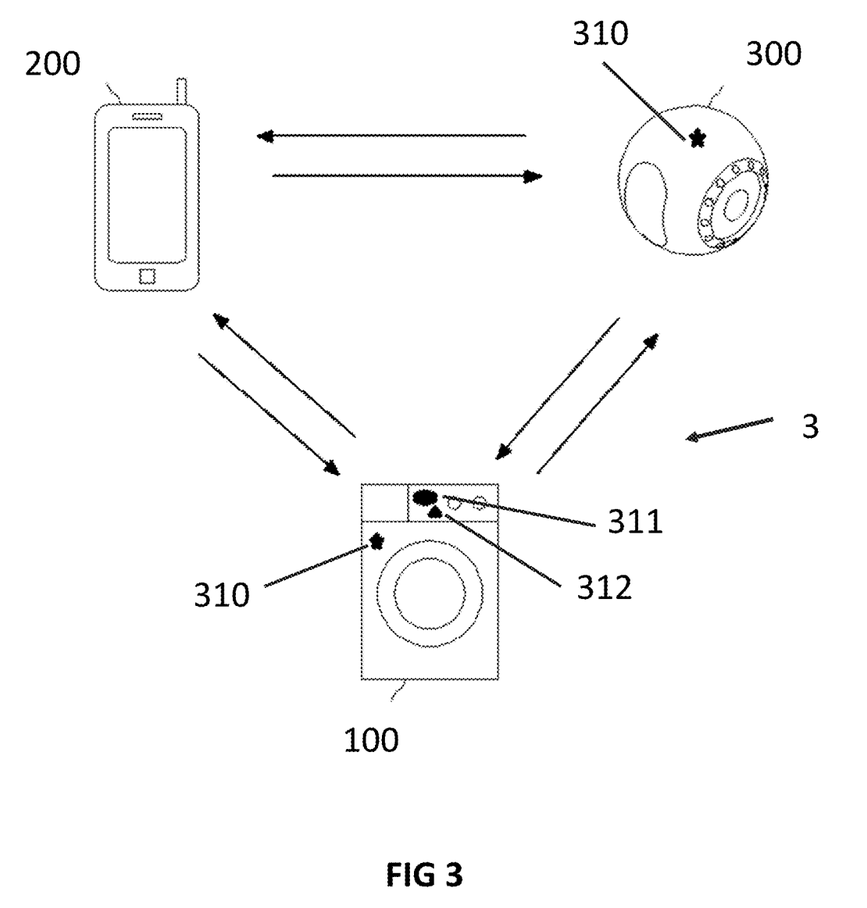
FIG. 3 is a schematic representation of one possible group of elements forming part of the system usable to implement the method of the present disclosure.

The system 3 can comprise a household appliance 100 which ultimately will perform the treatment cycle as is configured to receive the output of the method of the present disclosure, that is to say the treatment setting 205. Sensors 310 can be located either in the household appliance or be elsewhere on a standalone dosing unit 300 or separately provided. Sensors remain an optional feature of the system 3. A data processing unit 311 is configured to obtain the model or to establish the model based on measurements that were provided to the data-processing unit 311. A self-learning approach can be used in which each treatment cycle feeds a memory 312 with data points comprising all used values for configuration parameters during a treatment cycle, and provide a value for a thus obtained treatment performance. Some of the values can be input by a user into the memory 312. The data-processing unit 311 can access data stored in the memory 312 in order to perform the estimation of the model.

In the example illustrated on FIG. 3, the data-processing unit 311 is part of the household appliance 100. However, any computing device can be used instead, for example a mobile device 200, in which data as well as all relevant information required to establish a model based on obtained or measured data is available. A computer or server could also be used.

The data-processing unit 311 can typically exchange information with the household appliance 100, in particular so that it can send the treatment settings 205 to the household appliance 100 in order to parameterize the next treatment cycle.

In order to display some information to a user, displays on the household appliance can allow for example a manual selection of values for configuration parameters. A suggested setting can for example be displayed once the target treatment performance is selected by the user.

Alternatively, all the displays and selection can occur on a distant device such as the mobile device 200 which can then establish a communication with the household appliance.

Optionally, the system can include a dosing device 300. The dosing device is configured to be placed inside a housing of the household appliance, such as a drum in the case of a washing machine. It can then dispense a cleaning agent at any programmable time of the treatment cycle. The amount of cleaning agent dispensed as well as the timing of this dispensing can then serve as further configuration parameters for the treatment cycle, to further enhance the achievable treatment performance.

Examples

The present disclosure will further be illustrated with some of the examples provided below.

In this first example, a model is obtained for treatment cycles on a washing machine with seven configuration parameters, provided in table 1 below:

TABLE 1

| Variable | Possible ranges |
|---|---|
| X1: detergent amount | 0–27 g |
| X2. load | 1–9 kg |
| X3: wash temperature | 20° C.–60° C. |
| X4: water hardness | 0–21 dH |
| X5: Rotations per minute of drum | 30 rot/min–70 rot/min |
| X6: dirtiness | 0–6.5 (arbitrary score) |
| X7: treatment cycle duration | 45 min–120 min |

As a treatment performance value, the degree of cleanliness when cleaning a mix of 20 different types of stains is selected. Grades for the performances are provided as scores in arbitrary units: the higher the score, the better the cleaning performance on the mix of stains.

The design of experiments approach described above lead to the determination of the following polynomial function that best describes the relationship between the seven parameters and the achievable treatment performance:

$$f(x_1;x_2;x_3;x_4;x_5;x_6;x_7) = a_0 + a_1 x_1 + a_2 x_2 + a_3 x_3 + a_4 x_4 + a_5 x_5 + a_6 x_6 + a_7 x_7 + a_{12} x_1 x_2 + a_{13} x_1 x_3 + a_{14} x_1 x_4 + a_{15} x_1 x_5 + a_{16} x_1 x_6 + a_{17} x_1 x_7 + a_{23} x_2 x_3 + a_{24} x_2 x_4 + a_{25} x_2 x_5 + a_{26} x_2 x_6 + a_{27} x_2 x_7 + a_{34} x_3 x_4 + a_{35} x_3 x_5 + a_{36} x_3 x_6 + a_{37} x_3 x_7 + a_{45} x_4 x_5 + a_{46} x_4 x_6 + a_{47} x_4 x_7 + a_{56} x_5 x_6 + a_{57} x_5 x_7 + a_{67} x_6 x_7 + a_{11} x_1^2 + a_{22} x_2^2 + a_{44} x_4^2 + a_{55} x_5^2 + a_{123} x_1 x_2 x_3 + a_{124} x_1 x_2 x_4 + a_{126} x_1 x_2 x_6 + a_{134} x_1 x_3 x_4 + a_{135} x_1 x_3 x_5 + a_{136} x_1 x_3 x_6 + a_{146} x_1 x_4 x_6 + a_{157} x_1 x_5 x_7 + a_{167} x_1 x_6 x_7 + a_{237} x_2 x_3 x_7 + a_{246} x_2 x_4 x_6 + a_{256} x_2 x_5 x_6 + a_{257} x_2 x_5 x_7 + a_{345} x_3 x_4 x_5 + a_{346} x_3 x_4 x_6 + a_{356} x_3 x_5 x_6 + a_{357} x_3 x_5 x_7 + a_{367} x_3 x_6 x_7 + a_{456} x_4 x_5 x_6 + a_{467} x_4 x_6 x_7 + a_{11} x_1^2 x_2 + a_{11} x_1^2 x_5 + a_{11} x_1^2 x_5 + a_{11} x_1^2 x_7 + a_{133} x_1 x_3^2 + a_{144} x_1 x_4^2 + a_{155} x_1 x_5^2 + a_{16} x_1 x_6^2 + a_{17} x_1 x_7^2 + a_{22} x_2^2 x_6 + a_{25} x_2 x_5^2 + a_{26} x_2 x_6 + a_{27} x_2 x_7 + a_{334} x_3^2 x_4 + a_{335} x_3^2 x_5 + a_{33} x_3^2 x_6 + a_{33} x_3^2 x_7 + a_{37} x_3 x_7^2 + a_{45} x_4 x_5 + a_{55} x_5 x_6 + a_{557} x_5 x_7 + a_{111} x_1^3 + a_{444} x_4^3 + a_{555} x_5^3 + a_{777} x_7^3 + a_{1235} x_1 x_2 x_3 x_5 + a_{1245} x_1 x_2 x_4 x_5 + a_{1256} x_1 x_2 x_5 x_6 + a_{1267} x_1 x_2 x_6 x_7 + a_{1356} x_1 x_3 x_5 x_6 + a_{1357} x_1 x_3 x_5 x_7 + a_{1467} x_1 x_4 x_6 x_7 + a_{2345} x_2 x_3 x_4 x_5 + a_{2356} x_2 x_3 x_5 x_6 + a_{2357} x_2 x_3 x_5 x_7 + a_{2567} x_2 x_5 x_6 x_7 + a_{1134} x_1^2 x_3 x_4 + a_{1147} x_1^2 x_4 x_7 + a_{1167} x_1^2 x_6 x_7 + a_{1177} x_1^2 x_7^2 + a_{2277} x_2 x_7 + a_{4477} x_4^2 x_7^2 + a_{6677} x_6^2 x_7^2$$

Wherein values for the terms $a_k$ coefficients are provided in table 2 below.

TABLE 2

| | | | |
|---|---|---|---|
| $a_0$ | 784.69920817420973 | $a_{12}$ | −1.27455549312267 |
| $a_1$ | −2.38514332976406 | $a_{13}$ | 0.10620081204532 |
| $a_2$ | 26.85234038839855 | $a_{14}$ | −0.11991403760272 |
| $a_3$ | −2.17093535761455 | $a_{15}$ | 0.47781426891509 |
| $a_4$ | −1.57148540056153 | $a_{16}$ | −0.75780041164891 |
| $a_5$ | 12.19650279096576 | $a_{17}$ | 0.38391048424406 |
| $a_6$ | −10.56763399536431 | $a_{23}$ | −0.08867714503956 |
| $a_7$ | 0.96613052889051 | $a_{24}$ | 0.49090700201696 |
| $a_{25}$ | −1.12266307801032 | $a_{46}$ | 1.13781767534944 |
| $a_{26}$ | 1.21796822284984 | $a_{47}$ | −0.01846267439338 |
| $a_{27}$ | −0.40873208887929 | $a_{56}$ | −0.86697548393386 |
| $a_{34}$ | 0.08378299717433 | $a_{57}$ | −0.06917657527765 |
| $a_{35}$ | −0.01539110416951 | $a_{67}$ | 0.07512827185343 |
| $a_{36}$ | 0.70919819425475 | $a_{11}$ | −0.60897034947344 |
| $a_{37}$ | 0.09011891844043 | $a_{22}$ | 0.44345391250247 |
| $a_{45}$ | −0.17314883353558 | $a_{44}$ | 0.21490399370960 |
| $a_{55}$ | −0.05400858953983 | $a_{156}$ | −2.34761347110439E-003 |
| $a_{123}$ | 7.44406270640041E-003 | $a_{167}$ | −7.61718436782988E-004 |
| $a_{124}$ | −0.02004731174617 | $a_{237}$ | −1.55476846682297E-004 |
| $a_{126}$ | −7.73183018753666E-003 | $a_{246}$ | −0.03481990750414 |
| $a_{134}$ | −1.92961385213589E-003 | $a_{256}$ | 0.02278884822076 |
| $a_{135}$ | −1.64127998691560E-003 | $a_{257}$ | 9.94201425045813E-005 |
| $a_{137}$ | −3.69946275334401E-003 | $a_{345}$ | 2.08817532406298E-003 |
| $a_{146}$ | 5.43749192699410E-003 | $a_{346}$ | 4.79063674787285E-003 |
| $a_{356}$ | −3.26817303141544E-003 | $a_{117}$ | −4.93957622833753E-003 |
| $a_{357}$ | −6.67129569046923E-004 | $a_{133}$ | 7.66830309582949E-004 |
| $a_{367}$ | −2.94535883446150E-003 | $a_{144}$ | 7.21597107277037E-003 |
| $a_{456}$ | −0.01791317928388 | $a_{155}$ | −2.79241728382303E-003 |

TABLE 2-continued

| | | | |
|---|---|---|---|
| $a_{467}$ | 2.33123488796362E-004 | $a_{166}$ | 0.01415495625942 |
| $a_{112}$ | 0.01438281854019 | $a_{177}$ | -1.05708939851673E-003 |
| $a_{115}$ | -3.91409996119615E-003 | $a_{226}$ | 0.09966630138397 |
| $a_{116}$ | 0.01877593455339 | $a_{255}$ | 0.01005831859572 |
| $a_{266}$ | -0.27449360717517 | $a_{556}$ | 0.01307108624589 |
| $a_{277}$ | 2.61695733339553E-003 | $a_{557}$ | 7.85211125295420E-004 |
| $a_{334}$ | -3.08684407229965E-003 | $a_{111}$ | 0.01787428763830 |
| $a_{335}$ | 4.70790223160749E-004 | $a_{444}$ | -8.51573267650901E-003 |
| $a_{336}$ | -2.88146342581291E-003 | $a_{555}$ | -9.09396532154763E-004 |
| $a_{337}$ | -2.66952031165910E-005 | $a_{777}$ | 3.20750931931656E-005 |
| $a_{377}$ | -2.88641409407913E-004 | $a_{1235}$ | -3.45529556914799E-005 |
| $a_{455}$ | 1.05270995222512E-003 | $a_{1245}$ | 9.92735551857855E-005 |
| $a_{1256}$ | 6.16414865434885E-004 | $a_{2357}$ | 4.67935671301432E-005 |
| $a_{1267}$ | 3.23700007568655E-004 | $a_{2567}$ | -4.11416701288813E-005 |
| $a_{1356}$ | -1.63204956688188E-004 | $a_{1124}$ | 3.57631897096581E-004 |
| $a_{1357}$ | 5.00295604685590E-005 | $a_{1147}$ | 2.64971316590150E-005 |
| $a_{1367}$ | 1.33288205252095E-004 | $a_{1167}$ | -1.74867827437397E-005 |
| $a_{1467}$ | -1.71987558036020E-004 | $a_{1177}$ | 1.62832302106584E-005 |
| $a_{2345}$ | -2.80158986802582E-005 | $a_{2277}$ | -1.12749470144624E-004 |
| $a_{2356}$ | -4.93747002763226E-004 | $a_{4477}$ | 5.71096429720825E-006 |
| $a_{6677}$ | 2.61400645140488E-005 | | |

The following configuration parameter were fixed by the user or determined via sensors.

x3=40° C.; x4=14 dH; x5=50 rot/min; x6=3.25; x7=90 min

Figure 4:
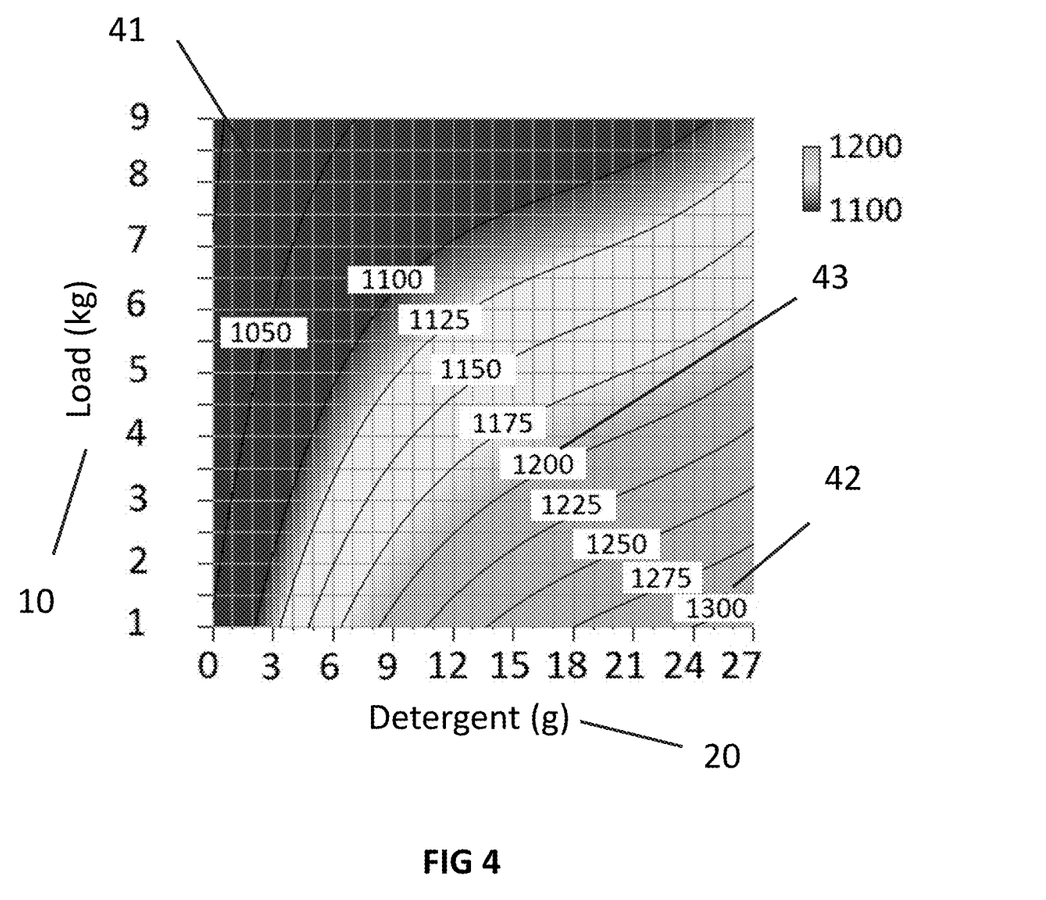
FIG. 4 is a contour plot showing the achievable performance parameter values for different loads of textiles in a washing machine and for different amounts of cleaning agent dispensed during the washing cycle.

As a result, the contour plot displaying the achievable treatment parameter values 43 as a function of cleaning agent amount on x axis 20 and load of items on y axis 10 is represented on FIG. 4. This contour plot shows that low dosages of cleaning agent is not efficient to clean high amounts of items in the washing machine. Indeed, values of the achievable treatment parameter in the upper left corner 41 of the contour plot of FIG. 4 are low. It is thus recommendable to dose a higher amount of cleaning agent and to reduce the amount of items to be cleaned, as the highest values for the achievable treatment parameter are found in the lower right corner 42 of the contour plot of FIG. 4.

This contour plot is particularly useful in finding optimized combinations of amount of cleaning agent used and load of items introduced. The dependency of these two factors is not linear as shown by the curvature of the straight isolines on contour plot of FIG. 4. One interesting teaching can be that for 4 kg of textiles to be cleaned, at least 15 grams of cleaning agent should be dispensed in order to reach an acceptably high cleanliness of the items after the cleaning cycle.

Figure 5:
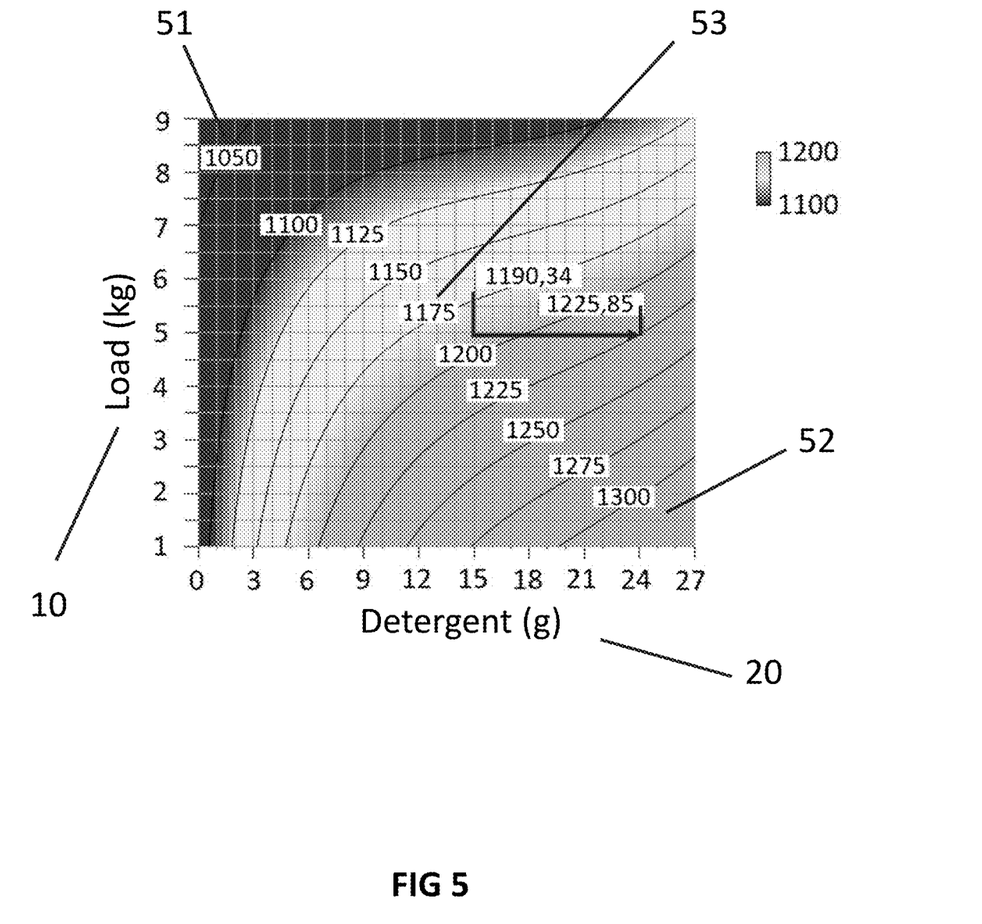
FIG. 5 is another contour plot showing the achievable performance parameter values for different loads of textiles in a washing machine and for different amounts of cleaning agent dispensed during the washing cycle.

FIG. 5 shows how the contour plot of FIG. 4 changes when the values of some of the fixed parameters changes. In the contour plot of FIG. 5, the value of the achievable cleanliness 53 of textiles is represented as a function of the amount of cleaning agent dosed on the x axis 20 and the load of items on the y axis 10. The other configuration parameters are fixed as follows:

x3=40° C.; x4=14 dH; x5=39 rot/min; x6=3.25; x7=120 min

In other words, the duration of the cleaning cycle is increased and the number of rotations per minute of the drum is reduced.

As shown by the isolines of the contour plot of FIG. 5, this leads to a different dependency of x1 and x2. In particular, 4 kg of textiles now only require 10 grams of the same cleaning agent to reach a high enough cleanliness value. For a load of 5 kg, changing the dosage of cleaning agent from 15 g to 24 grams leads to an increase of the cleanliness value of about 3%. The upper left corner of the contour plot of FIG. 5 comprises the lowest achievable cleanliness values 51 and the bottom right corner of the contour plot of FIG. 5 comprises the highest achievable cleanliness values 53.

Figure 6:
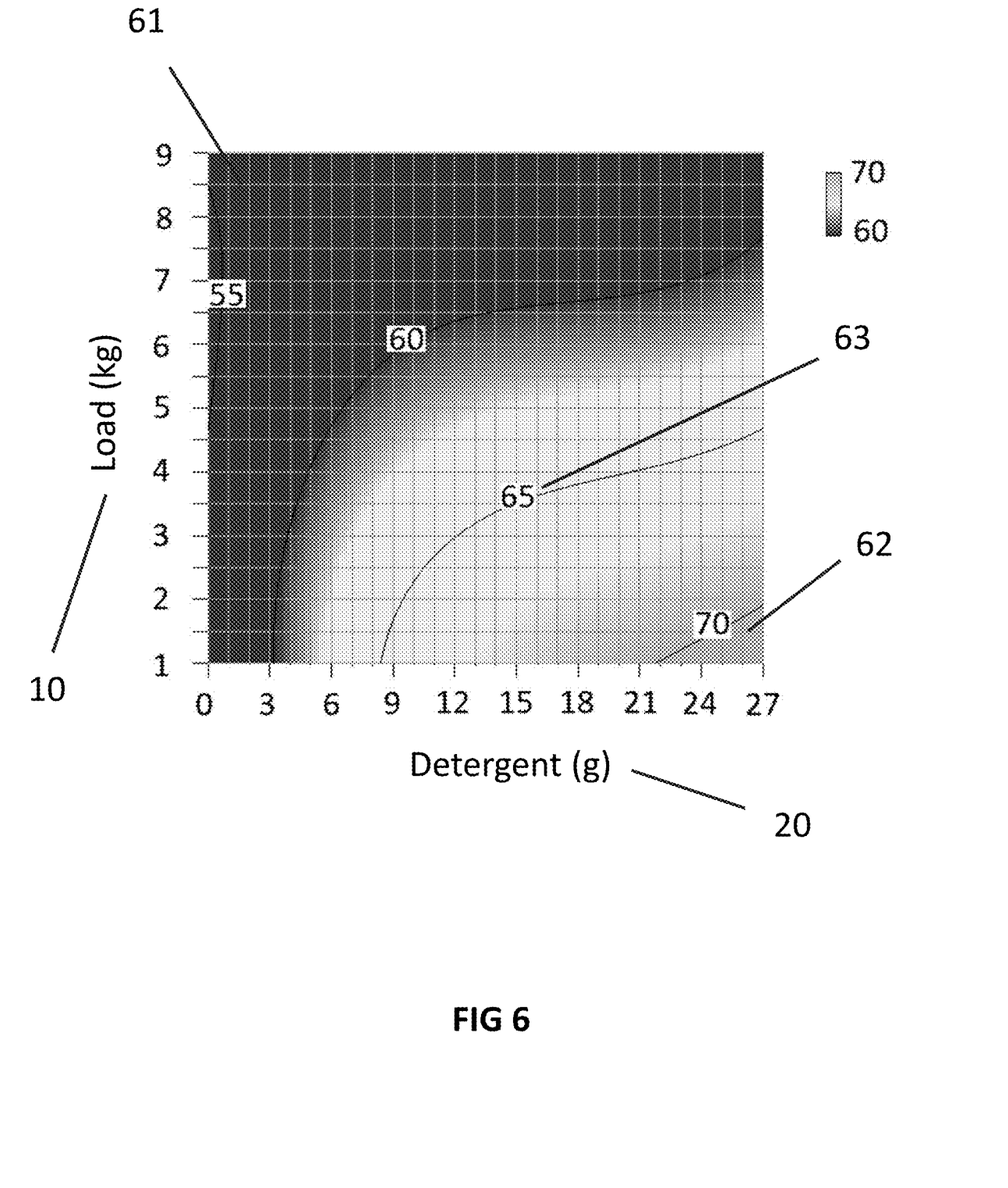
FIG. 6 is a third contour plot showing the achievable performance parameter values for different loads of textiles in a washing machine and for different amounts of cleaning agent dispensed during the washing cycle in another exemplary illustration of the present disclosure.

FIG. 6 is another contour plot obtained for a difference model which simulates the achievable cleanliness performance on removing lipstick stains on textiles.

Similarly to FIGS. 4 and 5, a contour plot representing the cleanliness results 63 for removing lipstick stains is shown as a function of amount of cleaning agent introduced on an x axis 20 and load of textiles on a y axis 10. The other configuration parameters are fixed as follows:

X3=40° C.; x4=14 dH; x5=50 rot/min; x6=3.25; x7=90 min

The contour plot of FIG. 6 shows that the overall achievable treatment performance is rather poor. The upper left corner 61 of the contour plots corresponds to particularly low achievable treatment performance values. The lower right corner 62 of the contour plot of FIG. 6, which comprises the highest achievable treatment performance values in these conditions still is barely acceptable.

Figure 7:
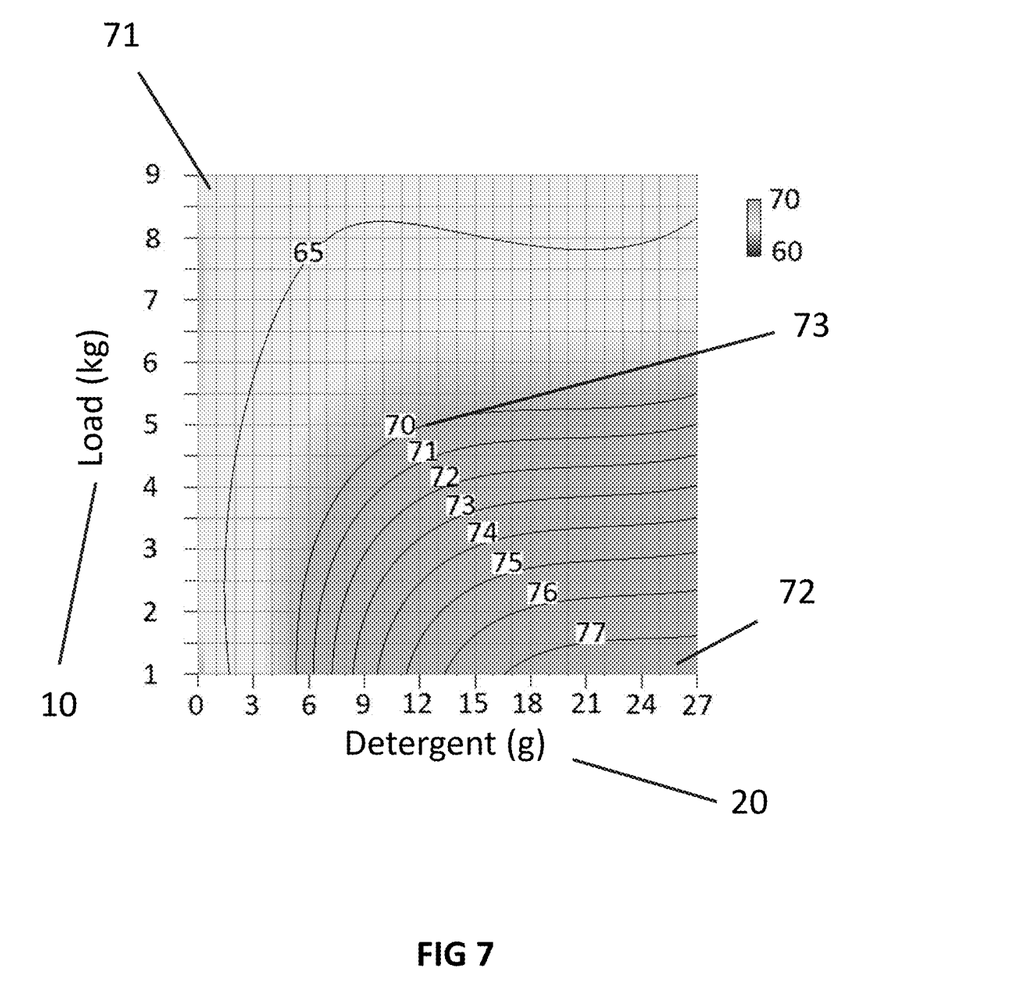
FIG. 7 is a fourth contour plot showing the achievable performance parameter values for different loads of textiles in a washing machine and for different amounts of cleaning agent dispensed during the washing cycle according to the exemplary illustration of the present disclosure depicted in FIG. 6.

To remedy this situation, an increase in the duration of the cleaning cycle from 90 min to 120 min is implemented as well as an increase in the temperature in the drum of the machine from 40° C. to 48° C. The dirtiness of the stains is reduced from 3.25 to 1.

These changes lead to the contour plot of FIG. 7 which shows a much more satisfactory achievable cleanliness result 73 over those of FIG. 6. The upper left corner 71 of this contour plot comprises lower achievable treatment performance values which are comparable to the highest ones of FIG. 5. The isolines of the contour plot of FIG. 7 show that there is a bigger flexibility in increasing the value of the cleanliness result by increasing the amount of detergent used. The values obtained in the lower right corner 72 of this contour plot are 20% higher than those of the upper left corner 71.

Although the above examples focus specifically on the cleanliness value as a treatment performance value, other treatment performances can be selected. In particular, a goal can also be to minimize the energy used to perform the treatment cycle.

Figure 8:
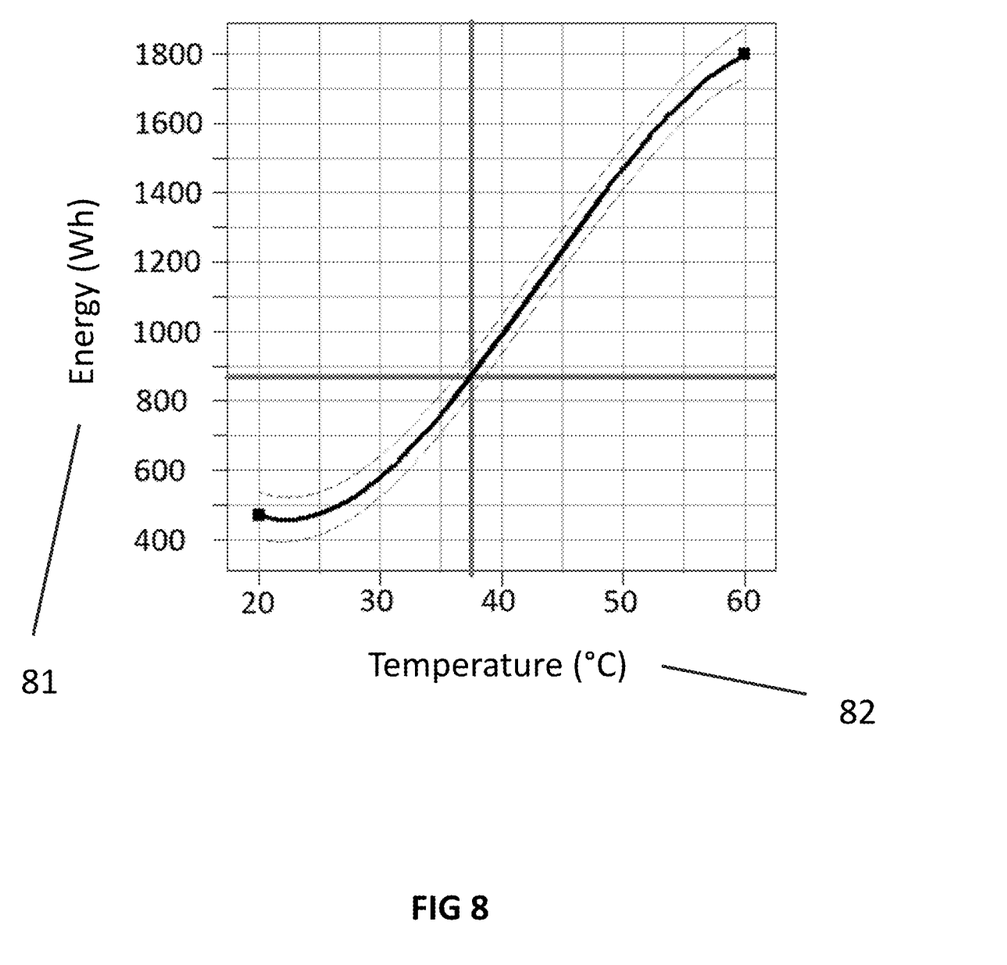
FIG. 8 is a two-dimensional graph showing the energy consumption of a washing machine as a function of temperature during the treatment cycle of the machine under fixed conditions with respect to the water hardness, load, amount of cleaning agent used, dirtiness of items introduced, rotations of the drum per minute.

FIG. 8 illustrates two-dimensional graphical representation of the function f obtained when six of its configuration parameters are fixed.

x1=15 g; x2=5 kg; x4=14 dH; x5=50 rot/min; x6=3.25; x7=90 min the graph of FIG. 8 therefore represents the influence of temperature $x_3$ represented on a horizontal axis 82 on the energy consumption represented on a vertical axis 81. In order to consume less than 900 Wh of energy, the graph of FIG. 8 teaches that the temperature should be set at less than 37° C.

The steps of the examples and embodiments described above can be implemented by a processor such as a computer. A computer program product comprising steps of the above-described method can be used to implement the method on a computer.

It is possible to store a computer program comprising instructions to implement the method of the present disclosure on different non-transitory computer readable storage mediums. These could for example comprise a processor or chip, FPGA (field programable gate array), an electronic circuit comprising several processors or chips, a hard drive, a flash or SD card, a USB stick, a CD-ROM or DVD-ROM or Blue-Ray disc, or a diskette.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

The invention claimed is:

1. A method for setting parameters of a treatment cycle in a household appliance and running the treatment cycle on the household appliance, the method comprising:
    obtaining, via a data-processing device, a model establishing a relationship between different sets of reference configuration parameters of treatment cycles and values of achievable treatment performance;
    setting, via the data-processing device, a target treatment performance for the treatment cycle;
    obtaining, via the data-processing device, fixed values for a subset of the reference configuration parameters of the treatment cycle, the subset of the reference configuration parameters comprising at most all of the reference configuration parameters but at least one remaining reference configuration parameter from all of the reference configuration parameters;
    determining, via the data-processing device, a value for the at least one remaining reference configuration parameter for which a difference between the target treatment performance and a predicted achievable treatment performance is below a predetermined threshold, the predicted achievable treatment performance being predicted by the model using the determined value for the at least one remaining reference configuration parameter;
    outputting, via the data-processing device, the parameters of the treatment cycle to the household appliance, the parameters of the treatment cycle being usable as setting parameters of the treatment cycle in the household appliance, the setting parameters of the treatment cycle comprising the determined value for the at least one remaining reference configuration parameter, and the fixed values for the subset of the reference configuration parameters; and
    running, via the data-processing device, the treatment cycle on the household appliance using the setting parameters of the treatment cycle,
    wherein:
    the model is in the form of a multidimensional function having at least two variables as inputs, the function comprising at least one term that is a multiplication product of a plurality of variables selected from the at least two variables; and
    the at least two variables as inputs are selected from among:
    a load of items introduced inside the household appliance;
    a temperature inside a treatment chamber of the household appliance;
    a number of turns per second of a rotating element of the household appliance;
    a value of a water hardness of water used by the household appliance during the treatment cycle;
    a value of dirtiness of soilings on items to be treated;
    a duration of the treatment cycle; and
    an amount of a type of cleaning agent.

2. The method of claim 1, wherein the multidimensional function is a polynomial function.

3. The method of claim 1, wherein the model is determined using an analysis of variance approach.

4. The method of claim 1, wherein the achievable treatment performance comprises at least one among:
    a cleanliness value of the treatment cycle;
    a number of soilings remaining on items to be treated;
    a value indicative of an amount of water used during the treatment cycle;
    a value indicative of an amount of energy consumed during the treatment cycle;
    a value indicative of an greenhouse gas emissions generated during the treatment cycle;
    a duration of the treatment cycle;
    a value indicative of noise generated by the household appliance during the treatment cycle;
    a temperature reached in the treatment chamber of the household appliance during the treatment cycle; and
    a number of rotations per minute of a drum of the household appliance during the treatment cycle.

5. The method of claim 1, wherein the at least one remaining reference configuration parameter comprises at least two remaining reference configuration parameters, the method further comprising:
    determining, based on the model, one selected reference configuration parameter from the at least two remaining reference configuration parameters, the at least two remaining reference configuration parameters having values for which the difference between the target treatment performance and a second predicted achievable treatment performance is minimized, the second predicted achievable treatment performance being predicted by the model using the values for the at least two remaining reference configuration parameters.

6. The method of claim 1, further comprising:
    determining a group of values for the at least one remaining reference configuration parameter for which a difference between the target treatment performance and a second predicted achievable treatment performance is below a second predetermined threshold, the second predicted achievable treatment performance being predicted by the model using the determined group of values for the at least one remaining reference configuration parameter;
    outputting a list of suggested reference configuration parameters of the treatment cycle, the suggested reference configuration parameters of the treatment cycle being suggested setting parameters of the treatment cycle in the household appliance using the determined group of values for the at least one remaining reference configuration parameter and the fixed values for the subset of the reference configuration parameters.

7. A method for setting parameters of a treatment cycle in a household appliance and running the treatment cycle on the household appliance, the method comprising:

obtaining, via a data-processing device, a model establishing a relationship between different sets of reference configuration parameters of treatment cycles and values of achievable treatment performance;

setting, via the data-processing device, a target treatment performance for the treatment cycle;

obtaining, via the data-processing device, fixed values for a subset of the reference configuration parameters of the treatment cycle, the subset of the reference configuration parameters comprising at most all of the reference configuration parameters but at least one remaining reference configuration parameter from all of the reference configuration parameters;

determining, via the data-processing device, a value for the at least one remaining reference configuration parameter for which a difference between the target treatment performance and a predicted achievable treatment performance is below a predetermined threshold, the predicted achievable treatment performance being predicted by the model using the determined value for the at least one remaining reference configuration parameter;

outputting, via the data-processing device, the parameters of the treatment cycle to the household appliance, the parameters of the treatment cycle being usable as setting parameters of the treatment cycle in the household appliance, the setting parameters of the treatment cycle comprising the determined value for the at least one remaining reference configuration parameter, and the fixed values for the subset of the reference configuration parameters; and running, via the data-processing device, the treatment cycle on the household appliance using the setting parameters of the treatment cycle, wherein:

the model is in the form of a multidimensional function having at least four variables as inputs, the function comprising at least one term that is a multiplication product of a plurality of variables selected from the at least four variables; and the at least four variables as inputs are selected from among:

a load of items introduced inside the household appliance;

a temperature inside a treatment chamber of the household appliance;

a number of turns per second of a rotating element of the household appliance;

a value of a water hardness of water used by the household appliance during the treatment cycle;

a value of dirtiness of soilings on items to be treated;

a duration of the treatment cycle; and an amount of a type of cleaning agent.

* * * * *